(12) United States Patent
Krishnan et al.

(10) Patent No.: US 12,570,242 B2
(45) Date of Patent: Mar. 10, 2026

(54) SENSOR ASSEMBLY WITH CLEANING

(71) Applicant: Ford Global Technologies, LLC, Dearborn, MI (US)

(72) Inventors: Venkatesh Krishnan, Canton, MI (US); Rashaun Phinisee, Ypsilanti, MI (US); Michael Robertson, Jr., Garden City, MI (US); Segundo Baldovino, Novi, MI (US); Laron Michelle Brown, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 705 days.

(21) Appl. No.: 18/045,926

(22) Filed: Oct. 12, 2022

(65) Prior Publication Data

US 2024/0123946 A1     Apr. 18, 2024

(51) Int. Cl.
*B60S 1/54* (2006.01)
*B60S 1/56* (2006.01)

(52) U.S. Cl.
CPC .. *B60S 1/54* (2013.01); *B60S 1/56* (2013.01)

(58) Field of Classification Search
CPC ............................. B60R 1/0602; B60S 1/0848
See application file for complete search history.

(56) References Cited

U.S. PATENT DOCUMENTS

| | | | |
|---|---|---|---|
| 9,707,896 B2 | 7/2017 | Boegel et al. | |
| 2017/0259788 A1* | 9/2017 | Villa-Real | ................. B08B 3/02 |
| 2018/0272996 A1* | 9/2018 | Nielsen | ..................... B60S 1/52 |
| 2020/0216034 A1* | 7/2020 | Velasco | ................... B60S 1/528 |
| 2022/0193734 A1* | 6/2022 | Cohrs | ................ G02B 27/0006 |

FOREIGN PATENT DOCUMENTS

| | | | | |
|---|---|---|---|---|
| CN | 112193164 A | * | 1/2021 | ........... B60R 1/0602 |
| DE | 102014213282 A1 | | 1/2016 | |
| WO | 2020158939 A1 | | 8/2020 | |

OTHER PUBLICATIONS

CN112193164—Machine Translation (Year: 2021).*

* cited by examiner

*Primary Examiner* — Marc Lorenzi

(74) *Attorney, Agent, or Firm* — Frank A. MacKenzie; Brooks Kushman P.C.

(57)     ABSTRACT

A sensor assembly includes a blower, a sensor, an air nozzle positioned to receive airflow from the blower and eject the airflow onto the sensor, an air pump positioned to eject airflow onto the sensor, and a heater mounted to the air pump and positioned to heat airflow passing through the air pump.

15 Claims, 9 Drawing Sheets

SENSOR ASSEMBLY WITH CLEANING

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (LIDAR) devices, and/or image processing sensors such as cameras.

DETAILED DESCRIPTION

Figure 1:
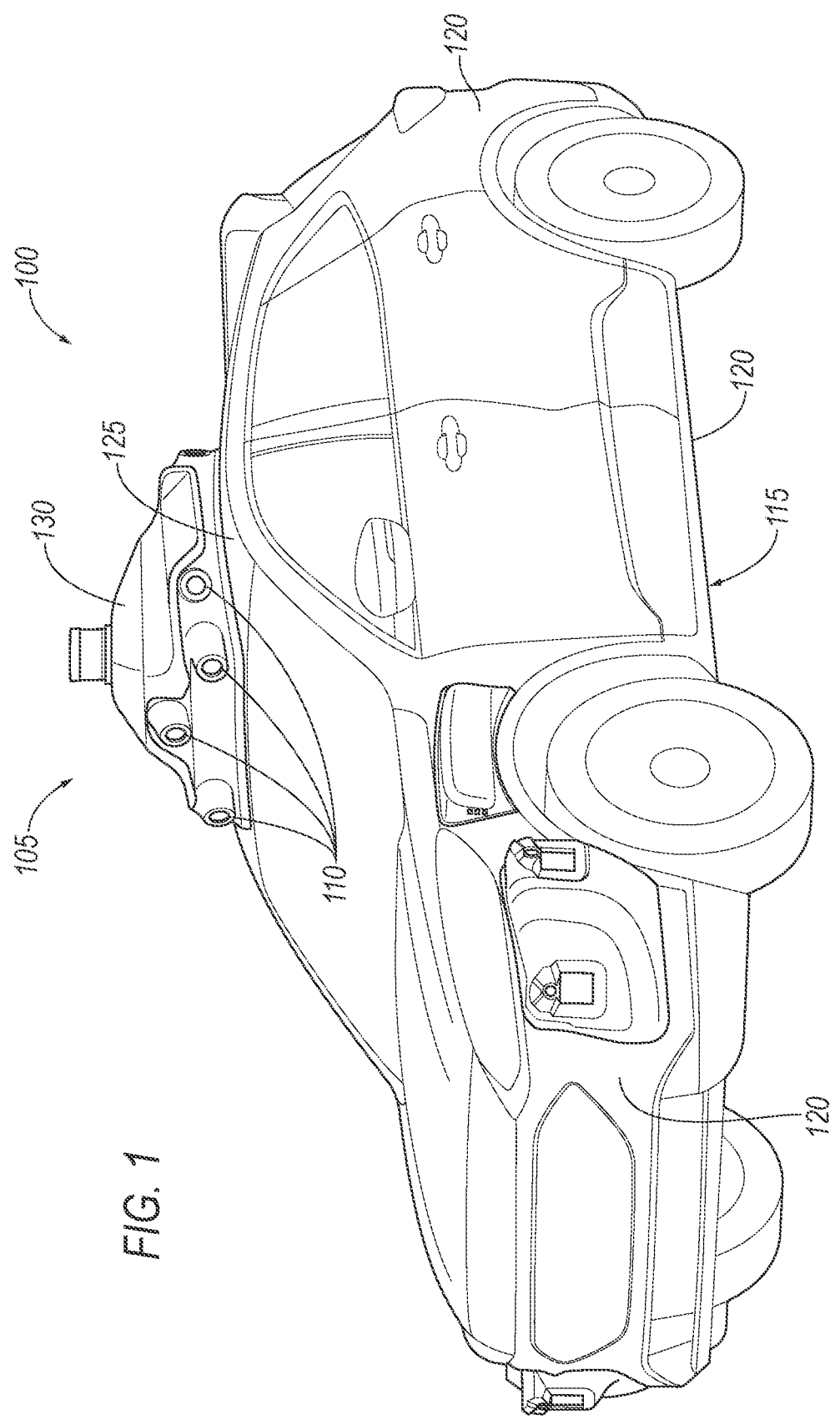
FIG. 1 is a perspective view of an example vehicle with a sensor assembly.

A sensor assembly includes a blower, a sensor, an air nozzle positioned to receive airflow from the blower and eject the airflow onto the sensor, an air pump positioned to eject airflow onto the sensor, and a heater mounted to the air pump and positioned to heat airflow passing through the air pump.

In an example, the heater may be a resistive heating element.

In an example, the air pump may be a piezoelectric air pump.

In an example, the air pump may include a chamber, an inlet, an inlet valve shaped to permit airflow to enter the chamber through the inlet and block airflow from exiting the chamber through the inlet, an outlet, an outlet valve shaped to permit airflow to exit the chamber through the outlet and block airflow from entering the chamber through the outlet, and a diaphragm partially defining the chamber and movable to change a volume of the chamber. In a further example, the heater may be mounted to the inlet valve. In a yet further example, the heater may be a first heater, and the sensor assembly may further include a second heater mounted to the outlet valve.

In another further example, the heater may be mounted to the outlet valve.

In another further example, the heater may be mounted to the inlet.

In another further example, the diaphragm may be a piezoelectric vibrator.

In an example, the air pump may be positioned to receive the airflow from the blower and eject the airflow to the air nozzle. In a further example, the air pump may be positioned in the air nozzle.

In another further example, the sensor assembly may further include a duct extending from the blower to the air nozzle, and the air pump may be positioned in the duct.

In another further example, all airflow from the blower to the air nozzle may pass through the air pump.

In an example, the air pump may be positioned outside an airflow path from the blower to the air nozzle. In a further example, the air pump may be positioned to draw in ambient air.

In another further example, the sensor assembly may further include a duct extending from the blower to the air nozzle, and the air pump may be positioned outside the duct.

In an example, the heater may be spaced from the sensor.

In an example, the sensor assembly may further include a controller communicatively coupled to the blower and to the air pump, the controller may be programmed to select from a plurality of operation modes for the blower and the air pump, and the controller in at least one of the operation modes may be programmed to run the air pump and refrain from running the blower. In a further example, the controller may be communicatively coupled to the heater, and the controller in at least one of the operation modes may be programmed to run the air pump, refrain from running the blower, and run the heater.

In another further example, the controller may be communicatively coupled to the sensor, and the controller may be programmed to select from the plurality of operation modes based on data received from the sensor.

With reference to the Figures, wherein like numerals indicate like parts throughout the several views, a sensor assembly 105 for a vehicle 100 includes a blower 205, a sensor 110, an air nozzle 210 positioned to receive airflow from the blower 205 and eject the airflow onto the sensor 110, an air pump 305 positioned to eject airflow onto the sensor 110, and a heater 310 mounted to the air pump 305 and positioned to heat airflow passing through the air pump 305.

The sensor assembly 105 provides cleaning for the sensor 110 (which may be one of a plurality of sensors 110). The airflow from the blower 205 can remove dust and debris from the sensor 110. The sensor 110 may thus have an increased accuracy of data generated by the sensor 110. The heated airflow from the air pump 305 may prevent or remove frost or ice from the sensor 110, also possibly increasing the accuracy of data generated by the sensor 110. Mounting the heater 310 to the air pump 305 may provide a more thorough heating of the airflow, compared to mounting the heater 310 directly to the air nozzle 210 or to a duct 215 between the blower 205 and the air nozzle 210. The airflow from the blower 205 may have too large a volumetric rate to be effectively heated by the heater 310.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a vehicle body 115. The vehicle 100 may be of a unibody construction, in which a frame and the vehicle body 115 of the vehicle 100 are a single component. The vehicle 100 may, alternatively, be of a body-on-frame construction, in which the frame supports the vehicle body 115 that is a separate component from the frame. The frame and vehicle body 115 may be formed of any suitable material, for example, steel, aluminum, etc.

The vehicle body 115 includes body panels 120 partially defining an exterior of the vehicle 100. The body panels 120 may present a class-A surface, e.g., a finished surface exposed to view by a customer and free of unaesthetic blemishes and defects. The body panels 120 include, e.g., a roof 125, etc.

The sensor assembly 105 may include a housing 130. The housing 130 may be attachable to the vehicle 100, e.g., to one of the body panels 120 of the vehicle 100, e.g., the roof 125. For example, the housing 130 may be shaped to be attachable to the roof 125, e.g., may have a shape matching a contour of the roof 125. The housing 130 may be attached to the roof 125, which can provide the sensors 110 with an unobstructed field of view of an area around the vehicle 100. The housing 130 may be formed of, e.g., plastic or metal.

The sensors 110 may detect the external world, e.g., objects and/or characteristics of surroundings of the vehicle 100, such as other vehicles, road lane markings, traffic lights and/or signs, pedestrians, etc. For example, the sensors 110 may be radar sensors, ultrasonic sensors, scanning laser range finders, light detection and ranging (lidar) devices, or image processing sensors such as cameras. As cameras, the sensors 110 can detect electromagnetic radiation in some range of wavelengths. For example, the sensors 110 may detect visible light, infrared radiation, ultraviolet light, or some range of wavelengths including visible, infrared, and/ or ultraviolet light. For example, the cameras can be charge-coupled devices (CCD), complementary metal oxide semiconductors (CMOS), or any other suitable type. For another example, the sensors 110 may be time-of-flight (TOF) cameras, which include a modulated light source for illuminating the environment and detect both reflected light from the modulated light source and ambient light to sense reflectivity amplitudes and distances to the scene. As cameras, the sensors 110 may include respective lenses 505 defining the fields of view of the sensors 110 (shown in FIG. 5).

The sensors 110 may be disposed in the housing 130. The sensors 110 may be arranged to collectively cover a 360° field of view with respect to a horizontal plane. The sensors 110 are fixed inside the housing 130. The sensors 110 are fixedly attached directly or indirectly to the housing 130. Each sensor 110 has a field of view through the respective lens 505 and a respective port of the housing 130, and the field of view of one of the sensors 110 may overlap the fields of view of the sensors 110 that are circumferentially adjacent to one another, i.e., that are immediately next to each other.

Figure 2:
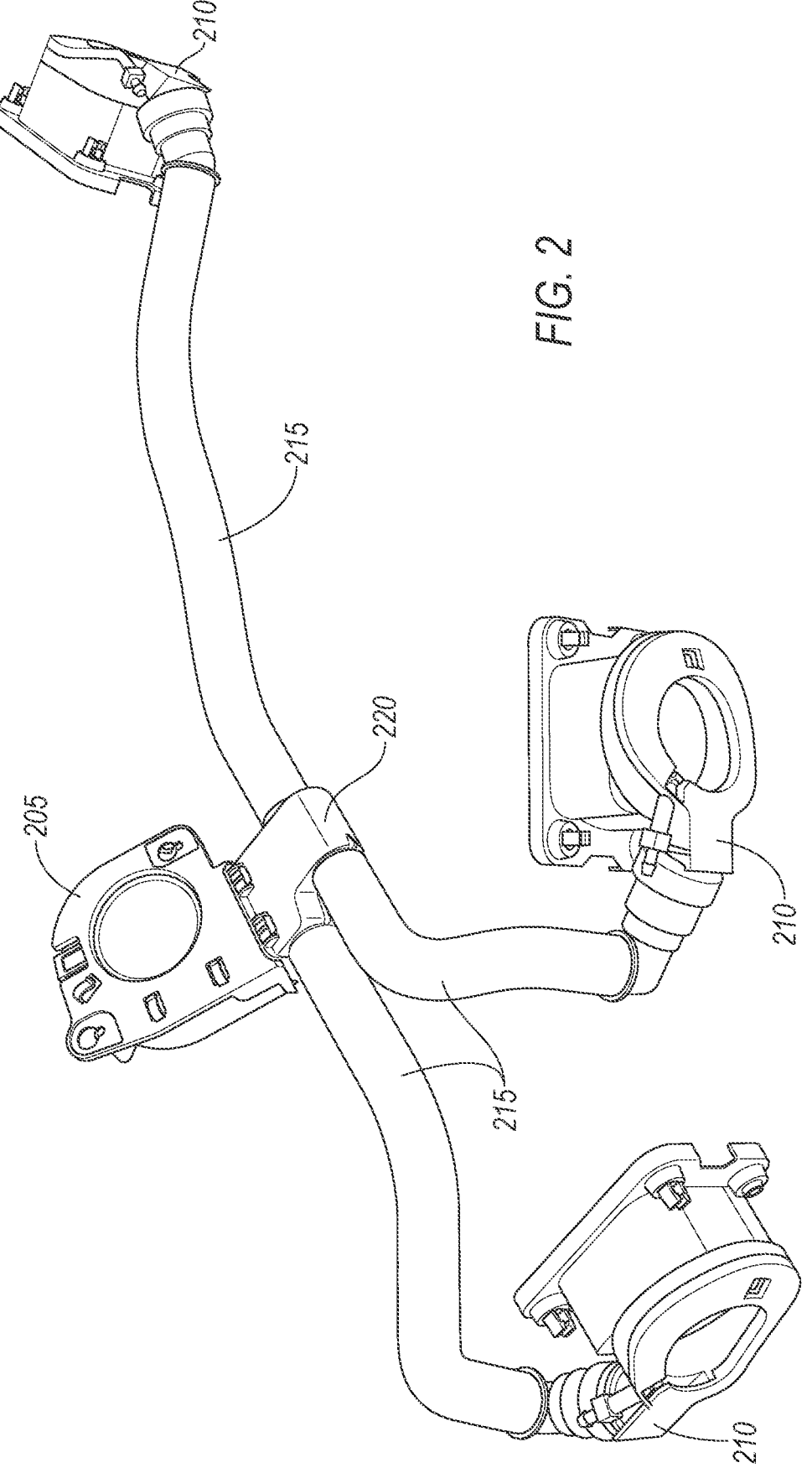
FIG. 2 is a perspective view of an example air-cleaning system of the sensor assembly.

With reference to FIG. 2, the sensor assembly 105 may include the blower 205, the ducts 215, and the air nozzles 210. The blower 205 and the air nozzles 210 are fluidly connected to each other (i.e., fluid can flow from one to the other) in sequence through the ducts 215. The blower 205, the ducts 215, and the air nozzles 210 may be fixed relative to the housing 130, e.g., mounted to the housing 130. The blower 205 and the ducts 215 may be disposed in the housing 130.

The blower 205 increases the pressure of a gas by reducing a volume of the gas or by forcing additional gas into a constant volume. The blower 205 may be any suitable type of blower, e.g., positive-displacement such as reciprocating, ionic liquid piston, rotary screw, rotary vane, rolling piston, scroll, or diaphragm; dynamic such as an air bubble, centrifugal, diagonal, mixed-flow, or axial-flow; or any other suitable type.

The ducts 215 extend from the blower 205 to the air nozzles 210. The ducts 215 may be, e.g., flexible tubes. The ducts 215 may include a junction 220 positioned at an outlet of the blower 205 and directing airflow to multiple singular ducts 215 for respective air nozzles 210.

The air nozzles 210 are positioned to receive airflow from the blower 205 via the ducts 215 and to eject the airflow onto the sensors 110. For example, each air nozzle 210 may be aimed at a respective one of the sensors 110, e.g., at the lens 505 of the respective sensor 110.

Figure 3:
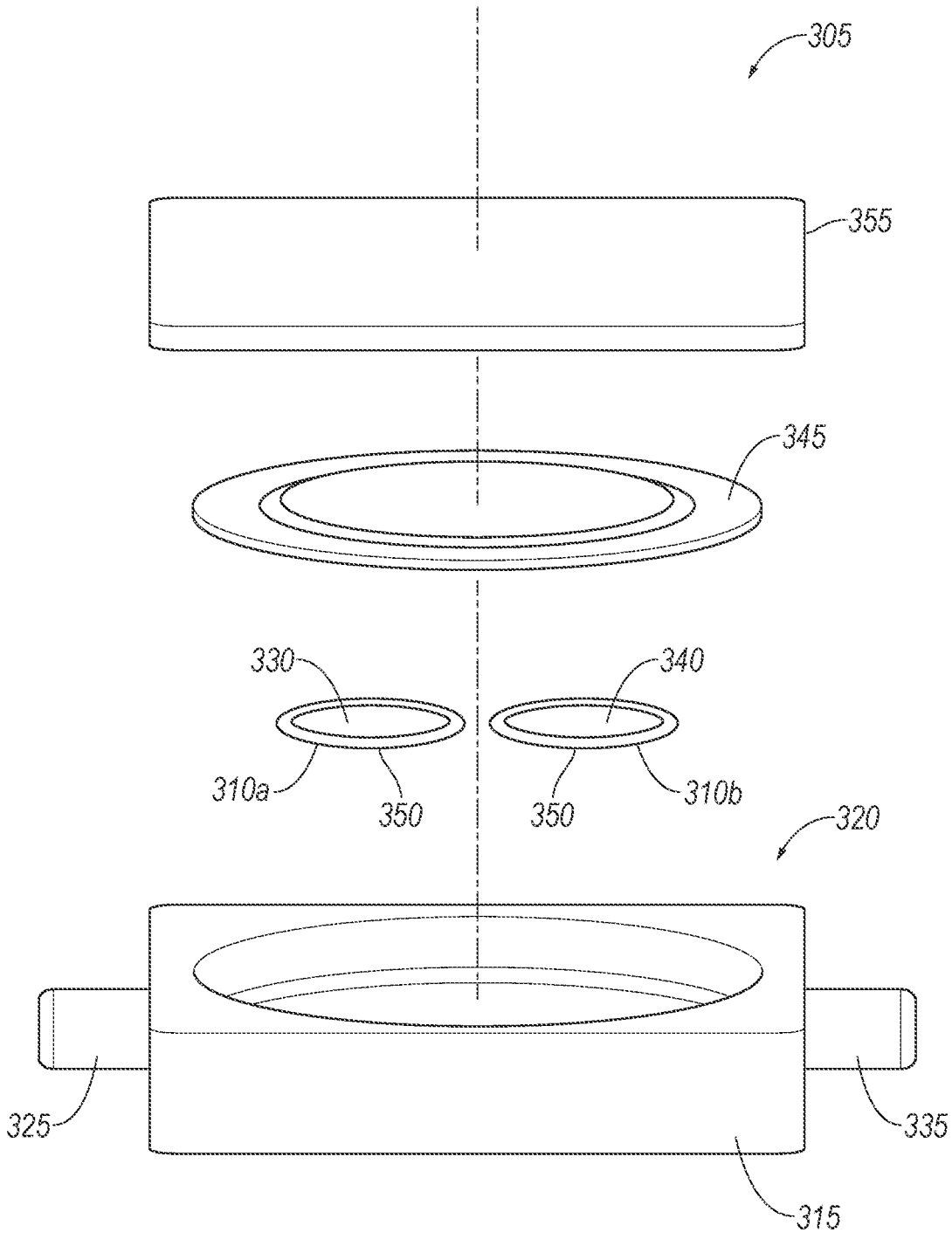
FIG. 3 is an exploded perspective view of an example air pump of the sensor assembly.
Figure 4:
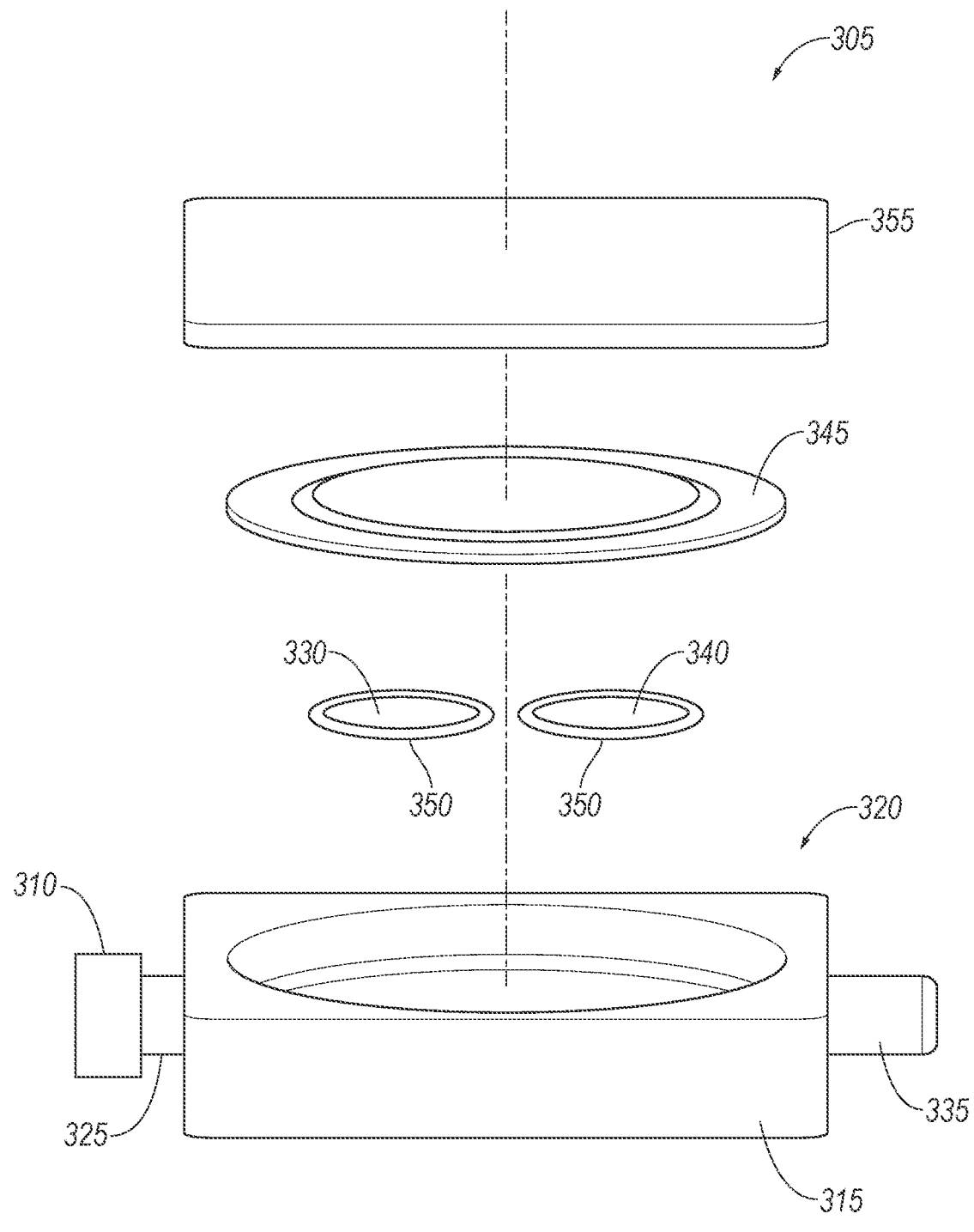
FIG. 4 is an exploded perspective view of another example air pump of the sensor assembly.

With reference to FIGS. 3-4, the air pump 305 may include a pump body 315, an inlet 325, an inlet valve 330, an outlet 335, an outlet valve 340, a diaphragm 345, and a cover 355. The air pump 305 includes a chamber 320 defined by the pump body 315 and the diaphragm 345. The pump body 315 partially defines the chamber 320 and has a fixed shape. The diaphragm 345 partially defines the chamber 320 and is movable to change a volume of the chamber 320. For example, the diaphragm 345 may be a piezoelectric vibrator. The application of an electrical current to the diaphragm 345 may change the shape of the diaphragm 345, e.g., vibrating the diaphragm 345 in and out to periodically increase and decrease the volume of the chamber 320. The cover 355 may enclose the diaphragm 345 and the pump body 315.

The inlet valve 330 may be positioned to obstruct the inlet 325 such that airflow only passes through the inlet 325 by passing through the inlet valve 330. The inlet valve 330 may be shaped to permit airflow to enter the chamber 320 through the inlet 325 and block airflow from exiting the chamber 320 through the inlet 325. The outlet valve 340 may be positioned to obstruct the outlet 335 such that airflow only passes through the outlet 335 by passing through the outlet valve 340. The outlet valve 340 may be shaped to permit airflow to exit the chamber 320 through the outlet 335 and block airflow from entering the chamber 320 through the outlet 335. The inlet valve 330 and outlet valve 340 may be, e.g., check valves, i.e., one-way valves.

The air pump 305 may be a piezoelectric air pump. The application of electrical current to the diaphragm 345 may cause the diaphragm 345 to alternately increase and decrease the volume of the chamber 320. As the volume of the chamber 320 increases, the reduced pressure in the chamber 320 draws in air through the inlet 325 and the inlet valve 330, while the outlet valve 340 blocks air from entering the chamber 320 through the outlet 335. As the volume of the chamber 320 decreases, the increased pressure pushes out air through the outlet 335 and the outlet valve 340, while the inlet valve 330 blocks air from exiting the chamber 320 through the inlet 325. Air is thereby pumped from the inlet 325 to the outlet 335.

The heater 310 is mounted to the air pump 305. The heater 310 is positioned to heat airflow passing through the air pump 305, as will be described in more detail in examples below. The heater 310 may be spaced from the sensor 110.

Spacing the heater 310 from the sensor 110 may help prevent heat damage to, e.g., a hydrophobic coating of the lens 505 of the sensor 110.

The heater 310 may be any suitable type of heater for heating the airflow through the air pump 305. In particular, the heater 310 may be a resistive heating element. In other words, the heater 310 may generate heat via electrical current flowing through a conductive material. Specifically, the heater 310 may have a positive temperature coefficient (PTC), i.e., a resistance that is positively related to voltage applied to the heating element. For example, the heater 310 may contain a doped polycrystalline ceramic such as barium titanate ($BaTiO_3$). As a constant voltage is applied to the heater 310 at an initial cool temperature, the resistance is initially low, and the current is initially high; as the heater 310 generates heat, the temperature of the heater 310 increases, and correspondingly the resistance increases and the current decreases, until the temperature, resistance, and current all reach a steady state. The steady-state temperature of the heater 310 can therefore be controlled by selecting a voltage applied to the heater 310. A resistive heating element is compact and may thus facilitate the placements of the heater 310 described below.

The sensor assembly 105 may further include a temperature sensor 350, e.g., a thermocouple, attached to the heater 310. A thermocouple includes two dissimilar electrical conductors forming a junction and produces a temperature-dependent voltage. The thermocouple may provide a temperature of the heater 310 to use as a feedback loop for controlling the heater 310.

With reference to FIG. 3, the heater 310 may be mounted to the inlet valve 330 and/or the outlet valve 340. For example, the heater 310 may be mounted to one of the inlet valve 330 or the outlet valve 340. For another example, the sensor assembly 105 may include two heaters 310: a first heater 310a and a second heater 310b mounted to the inlet valve 330 and to the outlet valve 340, respectively, as shown in FIG. 3. The heater(s) 310 may have a circular shape extending around the periphery of the inlet valve 330 and/or the outlet valve 340 so as to be exposed directly to the airflow. The inlet valve 330 and the outlet valve 340 may have small cross-sectional areas, permitting the heater(s) 310 to provide a thorough heating to the air flowing through the air pump 305.

With reference to FIG. 4, the heater 310 may be mounted to the inlet 325. The heater 310 may extend in a loop around the inlet 325 to more completely provide heating to the air flowing through the inlet 325. The inlet 325 may have a small cross-sectional area, permitting the heater 310 to provide a thorough heating to the air flowing through the air pump 305.

With reference to FIGS. 5-8, the air pump 305 is positioned to eject airflow onto the sensor 110, as will be described in more detail in examples below. The heated air from the air pump 305 may prevent or eliminate frost or ice from building up on the sensor 110.

Figure 5:
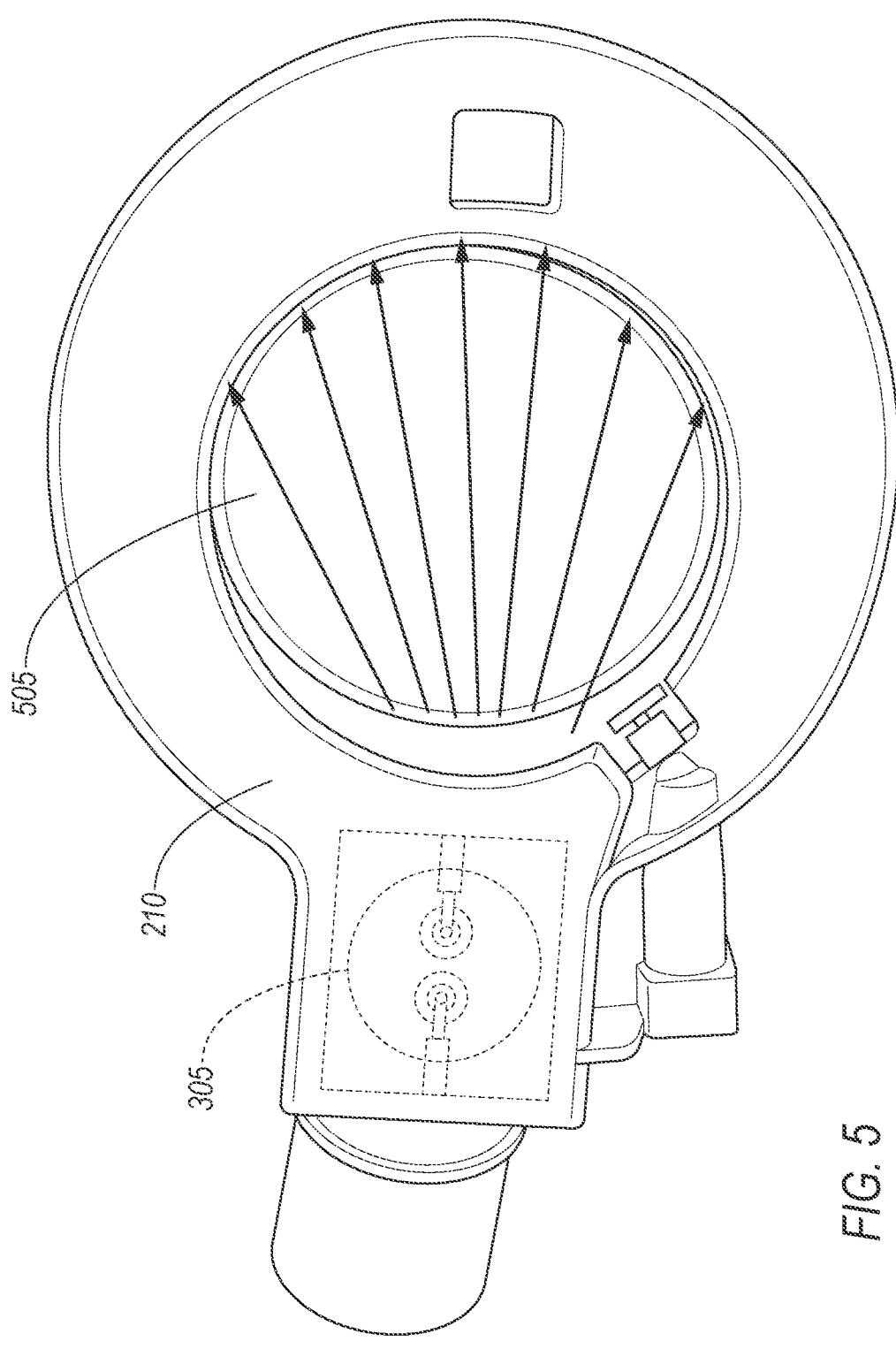
FIG. 5 is a plan view of a portion of the sensor assembly.
Figure 6:
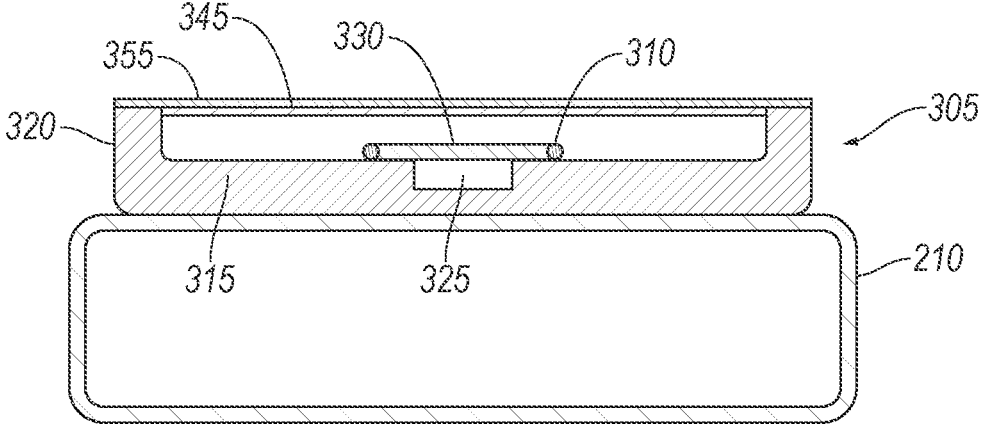
FIG. 6 is a cross-sectional view of an air nozzle of the sensor assembly with an example placement of the air pump.

With reference to FIGS. 5-6, the air pump 305 may be positioned outside an airflow path from the blower 205 to the air nozzle 210. For example, the air pump 305 may be positioned outside the ducts 215 and outside the air nozzle 210. The air pump 305 may be mounted on an exterior surface of the air nozzle 210. The air pump 305 may be positioned to draw in ambient air. For example, ambient air may be able to flow into and out of the housing 130, and the inlet 325 of the air pump 305 may be open inside the housing 130, permitting the air pump 305 to draw in ambient air that has entered the housing 130 through the inlet 325. As a result, the air pump 305 may be able to eject airflow regardless of whether the blower 205 is blowing.

Figure 7:
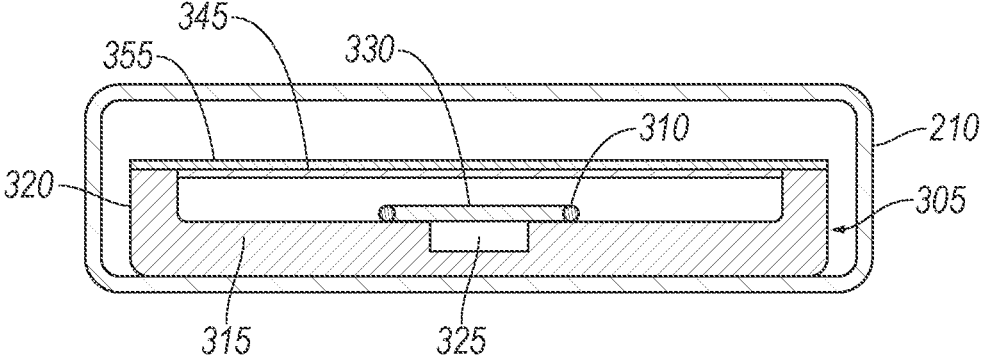
FIG. 7 is a cross-sectional view of the air nozzle of the sensor assembly with another example placement of the air pump.

With reference to FIGS. 5 and 7, the air pump 305 may be positioned to receive airflow from the blower 205 and eject the airflow to the air nozzle 210, e.g., through an opening of the air nozzle 210. For example, the air pump 305 may be positioned in the air nozzle 210. For example, the air pump 305 may partially obstruct the air nozzle 210, as shown in FIG. 7. When the blower 205 is active, some of the airflow through the duct 215 to the air nozzle 210 may pass around the air pump 305, and some of that airflow may enter the air pump 305 through the inlet 325. The air pump 305 may be able to eject airflow regardless of whether the blower 205 is blowing, e.g., by drawing in airflow from the opening of the air nozzle 210 around the air pump 305 when the blower 205 is off. For another example, the air pump 305 may fully obstruct the air nozzle 210. All airflow from the blower 205 to the air nozzle 210 may pass through the air pump 305. The use of the blower 205 may provide for a greater volume of airflow than the air pump 305 operating by itself.

Figure 8:
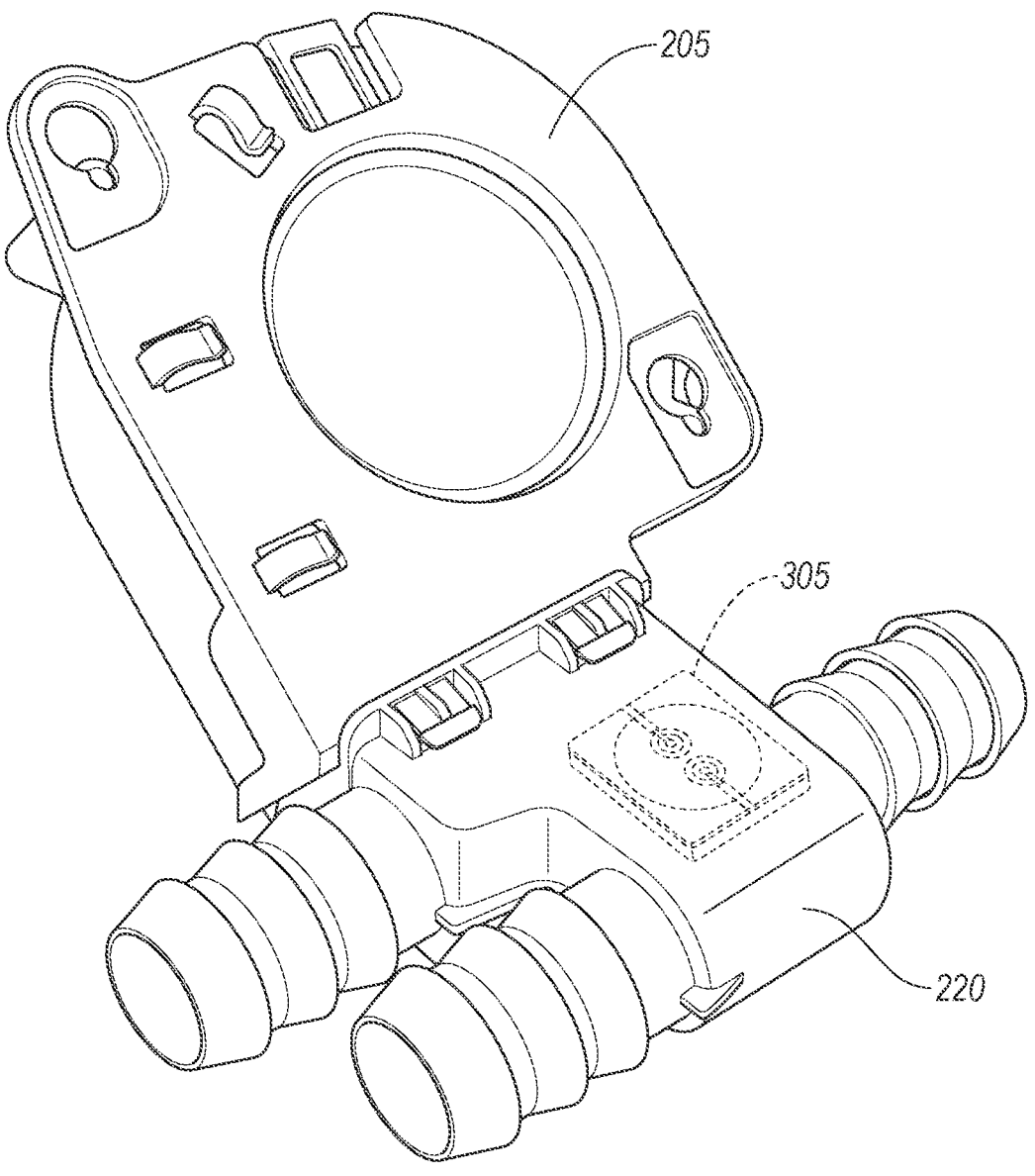
FIG. 8 is a perspective view of a portion of the sensor assembly with another example placement of the air pump.

With reference to FIG. 8, the air pump 305 may be positioned to receive the airflow from the blower 205 and eject the airflow to the air nozzle 210, e.g., from upstream of the air nozzle 210. For example, the air pump 305 may be positioned in one or more of the ducts 215, e.g., in the junction 220. The air pump 305 may thus be able to provide heated air to multiple sensors 110. All airflow from the blower 205 to the air nozzle 210 may pass through the air pump 305. The blower 205 may provide for a greater volume of airflow than the air pump 305 operating by itself.

Figure 9:
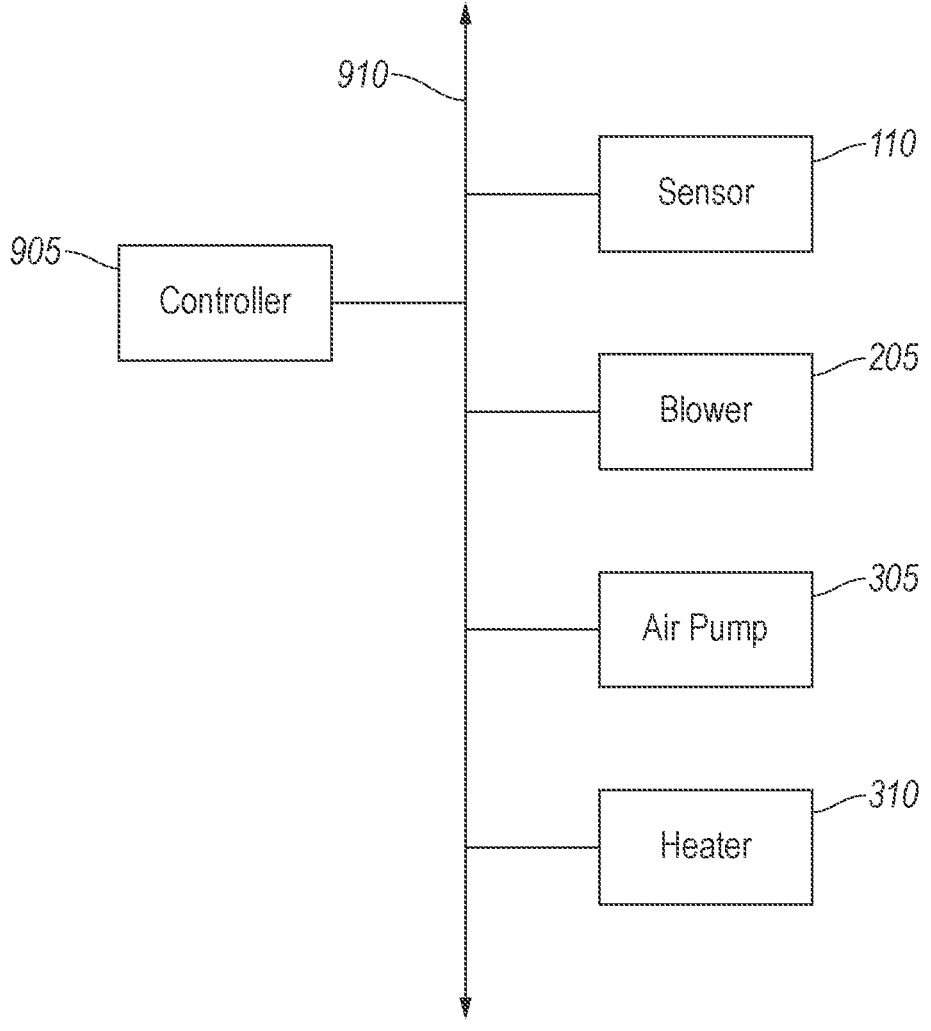
FIG. 9 is a block diagram of an example control system for the sensor assembly.

With reference to FIG. 9, the sensor assembly 105 may include a controller 905. The controller 905 is a microprocessor-based computing device, e.g., a generic computing device including a processor and a memory, an electronic control unit or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The controller 905 can thus include a processor, a memory, etc. The memory of the controller 905 can include media for storing instructions executable by the processor as well as for electronically storing data and/or databases, and/or the controller 905 can include structures such as the foregoing by which programming is provided. The controller 905 can be multiple computers coupled together.

The controller 905 may transmit and receive data through a communications network 910 such as a controller area network (CAN) bus, Ethernet, WiFi, Local Interconnect Network (LIN), onboard diagnostics connector (OBD-II), and/or by any other wired or wireless communications network. The controller 905 may be communicatively coupled to the sensor 110, the blower 205, the air pump 305, the heater 310, and other components via the communications network 910.

The controller 905 may be programmed to determine whether conditions for forming ice or frost are present. The conditions for forming ice or frost may include, e.g., an ambient temperature below a threshold, e.g., the freezing point. The controller 905 may receive the ambient temperature from a temperature sensor of the vehicle 100.

The controller 905 may be programmed to determine whether ice or frost is present on the sensor 110, e.g., based on data received from the sensor 110. For example, the controller 905 may determine that a region of the image data from the sensor 110 is unmoving over time as the vehicle 100 moves, indicating that frost or ice has covered a portion of the lens 505 corresponding to that region of the image data. For another example, the controller 905 can identify frost or ice using conventional image-recognition techniques, e.g., a convolutional neural network programmed to accept images as input and output an identified object. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential object, and the final output is the object with the highest score. If "ice" has the highest score, then ice is detected; otherwise, ice is not detected.

The controller 905 may be programmed to select from a plurality of operation modes for the blower 205, the air pump 305, and the heater 310. Each operation mode may specify whether to run or refrain from running each of the blower 205, the air pump 305, and/or the heater 310; rates of running the blower 205 and/or the air pump 305; and/or a target temperature at which to run the heater 310. All of the operation modes in which the heater 310 is running may specify that the air pump 305 is also running. In at least one of the operation modes, the controller 905 may be programmed to run the blower 205 and refrain from running the air pump 305 and the heater 310, e.g., in response to failing to detect ice or frost and/or failing to detect conditions for forming ice or frost. In at least one of the operation modes, the controller 905 may be programmed to run the air pump 305 and the heater 310 and refrain from running the blower 205, e.g., in response to detecting ice or frost. In at least one of the operation modes, the controller 905 may be programmed to run the blower 205, the air pump 305, and the heater 310, e.g., in response to failing to detect frost or ice and detecting conditions for forming ice or frost.

Figure 10:
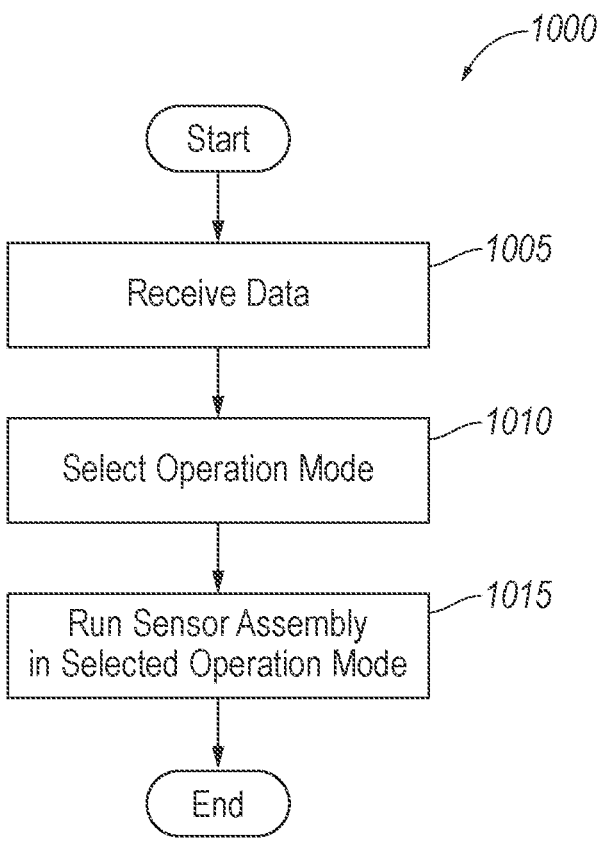
FIG. 10 is a process flow diagram of an example process for controlling the sensor assembly.

FIG. 10 is a process flow diagram illustrating an example process 1000 for controlling the sensor assembly 105. The memory of the computer stores executable instructions for performing the steps of the process 1000 and/or programming can be implemented in structures such as mentioned above. As a general overview of the process 1000, the controller 905 receives data from the sensor 110, selects one of the operation modes, and operates the sensor assembly 105 according to the selected operation mode.

The process 1000 begins in a block 1005, in which the controller 905 receives data from the sensors 110 via the communications network 910. The controller 905 may also receive data from other types of sensors, e.g., the ambient temperature from the temperature sensor.

Next, in a block 1010, the controller 905 selects an operation mode from the operation modes, as described above. The controller 905 may select the operation mode based on data received in the block 1005, e.g., data received from the sensor 110. For example, the controller 905 may select the operation mode based on whether ice or frost are detected and/or based on whether conditions for ice or frost are present, determined as described above. Whether conditions for ice or frost are present may depend on the ambient temperature, as described above. Whether ice or frost are detected may depend on that data received from the sensor 110.

Next, in a block 1015, the controller 905 operates the sensor assembly 105 according to the operation mode selected in the block 101, e.g., runs or refrains from running the blower 205, the air pump 305, and the heater 310, as described above. After the block 1015, the process 1000 ends.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. A sensor assembly comprising:
a blower;
a sensor;
an air nozzle positioned to receive airflow from the blower and eject the airflow onto the sensor;
an air pump mounted on an exterior surface of the air nozzle and positioned to draw in ambient air and eject the ambient air onto the sensor; and a heater mounted to the air pump and positioned to heat the ambient air passing through the air pump;
wherein the air pump is a piezoelectric air pump.

2. The sensor assembly of claim 1, wherein the heater is a resistive heating element.

3. The sensor assembly of claim 1, wherein the air pump includes a chamber, an inlet, an inlet valve shaped to permit airflow to enter the chamber through the inlet and block airflow from exiting the chamber through the inlet, an outlet, an outlet valve shaped to permit airflow to exit the chamber through the outlet and block airflow from entering the chamber through the outlet, and a diaphragm partially defining the chamber and movable to change a volume of the chamber.

4. The sensor assembly of claim 3, wherein the heater is mounted to the inlet valve.

5. The sensor assembly of claim 4, wherein the heater is a first heater, the sensor assembly further comprising a second heater mounted to the outlet valve.

6. The sensor assembly of claim 3, wherein the heater is mounted to the outlet valve.

7. The sensor assembly of claim 3, wherein the heater is mounted to the inlet.

8. The sensor assembly of claim 3, wherein the diaphragm is a piezoelectric vibrator.

9. The sensor assembly of claim 1, wherein the air pump is positioned outside an airflow path from the blower to the air nozzle.

10. The sensor assembly of claim 9, further comprising a duct extending from the blower to the air nozzle and defining the airflow path from the blower to the air nozzle, wherein the air pump is positioned outside the duct.

11. The sensor assembly of claim 1, wherein the heater is spaced from the sensor.

12. The sensor assembly of claim 1, further comprising a controller communicatively coupled to the blower and to the air pump, wherein the controller is programmed to select from a plurality of operation modes for the blower and the air pump, and the controller in at least one of the operation modes is programmed to run the air pump and refrain from running the blower.

13. The sensor assembly of claim 12, wherein the controller is communicatively coupled to the heater, and the controller in at least one of the operation modes is programmed to run the air pump, refrain from running the blower, and run the heater.

14. The sensor assembly of claim 12, wherein the controller is communicatively coupled to the sensor, and the controller is programmed to select from the plurality of operation modes based on data received from the sensor.

15. A sensor assembly comprising:

a blower;

a sensor;

an air nozzle positioned to receive airflow from the blower and eject the airflow onto the sensor;

an air pump mounted on an exterior surface of the air nozzle and positioned to draw in ambient air and eject the ambient air onto the sensor; and a heater mounted to the air pump and positioned to heat the ambient air passing through the air pump;

wherein the air pump includes a chamber, an inlet, an inlet valve shaped to permit airflow to enter the chamber through the inlet and block airflow from exiting the chamber through the inlet, an outlet, an outlet valve shaped to permit airflow to exit the chamber through the outlet and block airflow from entering the chamber through the outlet, and a diaphragm partially defining the chamber and movable to change a volume of the chamber; and the diaphragm is a piezoelectric vibrator.

\* \* \* \* \*